(12) United States Patent
Riddington et al.

(10) Patent No.: US 7,596,126 B2
(45) Date of Patent: Sep. 29, 2009

(54) METHOD, APPARATUS AND COMPUTER PROGRAM PRODUCT PROVIDING SLOW ASSOCIATED CONTROL CHANNEL (SACCH) REPETITION

(75) Inventors: Eddie Riddington, London (GB); Harri Jokinen, Pertteli (FI); Sami Pelkonen, Oulu (FI)

(73) Assignee: Nokia Corporation, Espoo (FI)

( * ) Notice: Subject to any disclaimer, the term of this patent is extended or adjusted under 35 U.S.C. 154(b) by 490 days.

(21) Appl. No.: 11/395,864

(22) Filed: Mar. 30, 2006

(65) Prior Publication Data
US 2006/0221880 A1 Oct. 5, 2006

Related U.S. Application Data

(60) Provisional application No. 60/667,738, filed on Apr. 1, 2005.

(51) Int. Cl.
*H04Q 7/00* (2006.01)
(52) U.S. Cl. .................. 370/342; 370/329; 370/392; 455/424; 714/755; 715/340
(58) Field of Classification Search ............... 370/337, 370/338, 328, 342, 392; 455/424; 714/755; 715/340
See application file for complete search history.

(56) References Cited

U.S. PATENT DOCUMENTS

| 6,996,083 | B1 * | 2/2006 | Balachandran et al. ...... 370/337 |
| 7,006,477 | B1 * | 2/2006 | Balachandran et al. ...... 370/337 |
| 7,212,515 | B2 * | 5/2007 | Dharia et al. ............... 370/347 |
| 2002/0194566 | A1 * | 12/2002 | Bellier et al. ............... 714/755 |
| 2007/0275712 | A1 * | 11/2007 | Sebire et al. ................ 455/424 |

FOREIGN PATENT DOCUMENTS

EP 1 646 253 A2 4/2006

OTHER PUBLICATIONS

ETSI TS 144 005, V6.1.0 (Nov. 2005), Digital Cellular Telecommunications System (Phase 2+); Data Link (DL) Layer General Aspects (3GPP TS 44.005 version 6.1.0 Release 6), 20 pgs.
ETSI TS 144 018, V6.11.0 (Jan. 2005), Digital Cellular Telecommunications System (Phase 2+); Mobile Radio Interface Layer 3 Specification; Radio Resource Control (RRC) protocol (3GPP TS 44.018 version 6.11.0 Release 6), Section 3.4, pp. 45-94.

(Continued)

*Primary Examiner*—Danh C Le
(74) *Attorney, Agent, or Firm*—Harrington & Smith, PC

(57) ABSTRACT

Techniques are presented for repetition on both uplink and downlink Slow Associated Control Channel (SACCH) channels. For instance, an exemplary method is disclosed that is performed by a mobile node. The method includes receiving from a network node a first block of data over a downlink SACCH channel, and storing the first block of data. The method also includes, subsequent to receiving the first block of data, receiving from the network node a second block of data over the downlink SACCH channel. The method further includes attempting to decode the second block of data. The method additionally includes, in response to a failure in the attempt to decode the second block of data, combining into a combination the second block with the stored first block of data. The method also includes attempting to decode the combination.

26 Claims, 11 Drawing Sheets

OTHER PUBLICATIONS

3GPP TS 44.006, V6.2.0 (Nov. 2005), 3$^{rd}$ Generation Partnership Project; Technical Specification Group GSM Edge Radio Access Network; Mobile Station—Base Station System (MS-BSS) interface; Data Link (DL) layer specification (Release 6), 60 pgs.

"Improvements to FACCH and SACCH", 3GPP TSG-GERAN Meeting #23, Ericsson GP-050405, Jan. 24-28, 2005, 10 pgs.

Technical Specification Group GERAN WG1 Radio Aspects Meeting #23, Jan. 25-27, 2005, GP-050555, pp. 1, 8-9.

"FACCH improvements; performance", 3GPP TSG GERAN #23, Ericsson, Jan. 24-28, 2005, GP-050194, 4 pgs.

3GPP TS 44.006, V6.3.0 (Jan. 2006) 3$^{rd}$ Generation Partnership Project; Technical Specification Group GSM Edge Radio Access Network; Mobile Station—Base Station System (MS-BSS) interface; Data Link (DL) layer specification (Release 6), pp. 2, 10, 54-55.

* cited by examiner

METHOD, APPARATUS AND COMPUTER PROGRAM PRODUCT PROVIDING SLOW ASSOCIATED CONTROL CHANNEL (SACCH) REPETITION

CROSS-REFERENCE TO RELATED APPLICATIONS

The present application claims priority under 35 U.S.C. §119(e)(1) to U.S. Provisional Application No. 60/667,738, filed on Apr. 1, 2005, the disclosure of which is hereby incorporated by reference in its entirety.

TECHNICAL FIELD

Examples of this invention relate generally to digital cellular communications systems, networks and devices and, more specifically, relate to signaling between a network node and a mobile node, also referred to as a mobile station.

BACKGROUND

The following abbreviations employed herein are defined as follows:
AMR Adaptive Multi-Rate
BSS Base-Station Subsystem
DTX Discontinuous transmission
FACCH Fast Associated Control Channel
FR Full Rate
GERAN GSM/EDGE Radio Access Network
GPRS General Packet Radio System
HR Half Rate
PC Power Control
PDTCH Packet Data Traffic Channel
SACCH Slow Associated Control Channel
SI System Information
TA Timing Advance
TSG-GERAN Technical Specification Group GERAN
UI Un-numbered Information
WB Wideband It has been generally accepted within TSG-GERAN that the link performance of the associated control channels (FACCH & SACCH) is a limitation to realizing the full capacity gains that are achievable with AMR coding.

The inventors are aware of two proposals have been made within TSG-GERAN to enhance the operation of the SACCH.

The first proposal, denoted 'Parallel SACCH', proposes to send a SACCH repetition within IDLE slots of a traffic channel. This would then allow the mobile station to combine the SACCH and the parallel SACCH sent using the IDLE slot(s) of a traffic channel prior to decoding, thus improving the likelihood of a successful decode.

One drawback of this approach is that the IDLE slots are already used by the mobile station to perform neighbor cell monitoring, and reducing the time available for neighbor cell monitoring would have an adverse impact on handover performance. To provide the possibility of an early decode, it was proposed to reverse the order that the parallel SACCH blocks are sent. However, it is unclear if this would provide a benefit in poor channel conditions, when the need to receive all parallel SACCH blocks will be the greatest.

The second proposal, denoted 'Spread SACCH', proposes to send a SACCH repetition through the use of speech bit stealing. However, this approach would adversely impact speech quality, and is not compatible with DTX. In addition, a different speech puncturing pattern would be needed on a per mode, per traffic channel basis, implying a complex solution. Currently, the following traffic channels require an enhancement: AMR FR, E-AMR HR, AMR-WB FR, E-AMR-WB FR & E-AMR-WB HR (on these channels the code rate of the most robust mode is significantly less than the SACCH).

What is thus needed, and what was not available prior to this invention, is a satisfactory procedure to eliminate the above-described and other limitations with regard to the SACCH channel.

BRIEF SUMMARY

In an exemplary embodiment, a method is disclosed that is performed by a mobile node. The method includes receiving from a network node a first block of data over a downlink Slow Associated Control Channel (SACCH) channel, and storing the first block of data. The method also includes, subsequent to receiving the first block of data, receiving from the network node a second block of data over the downlink SACCH channel. The method further includes attempting to decode the second block of data. The method additionally includes, in response to a failure in the attempt to decode the second block of data, combining into a combination the second block with the stored first block of data. The method also includes attempting to decode the combination.

In another exemplary embodiment, a program product is disclosed that tangibly embodies a program of machine-readable instructions executable by at least one data processor of a mobile node to perform operations. The operations include receiving from a network node a first block of data over a downlink SACCH channel, and storing the first block of data. The operations also include, subsequent to receiving the first block of data, receiving from the network node a second block of data over the downlink SACCH channel. The operations further include attempting to decode the second block of data and, in response to a failure in the attempt to decode the second block of data, combining into a combination the second block with the stored first block of data. The operations include attempting to decode the combination.

In an additional exemplary embodiment, a mobile node is disclosed that includes at least one memory including a set of instructions. The mobile node also includes at least one data processor coupled to the at least one memory and configured to execute the set of instructions. The at least one data processor is configured when the set of instructions are executed to perform operations including receiving from a network node a first block of data over a downlink SACCH channel, and storing the first block of data. The operations also include, subsequent to receiving the first block of data, receiving from the network node a second block of data over the downlink SACCH channel. The operations further include attempting to decode the second block of data. The operations also include, in response to a failure in the attempt to decode the second block of data, combining into a combination the second block with the stored first block of data. The operations further include attempting to decode the combination.

In another example, a method is disclosed for providing SACCH repetition on a downlink SACCH channel. The method includes determining whether a block of data to be transmitted over the downlink SACCH channel from a network node to a mobile node is a repetition candidate. The method also includes, in response to the block of data being a repetition candidate, scheduling the block as a pair of blocks for transmission over the downlink SACCH channel from the network node to the mobile node. The scheduling includes in a first SACCH period, transmitting the block from the network node to the mobile node over the downlink SACCH channel, and also includes in a second SACCH period, retransmitting the block from the network node to the mobile node over the downlink SACCH channel.

In another exemplary embodiment, a program product is disclosed that tangibly embodies a program of machine-readable instructions executable by at least one data processor of a network node to perform operations. The operations include determining whether a block of data to be transmitted over a downlink SACCH channel from the network node to a mobile node is a repetition candidate. The operations also include, in response to the block of data being a repetition candidate, scheduling the block as a pair of blocks for transmission over the downlink SACCH channel from the network node to the mobile node. The scheduling includes, in a first SACCH period, transmitting the block from the network node to the mobile node over the downlink SACCH channel. The scheduling also includes, in a second SACCH period, retransmitting the block from the network node to the mobile node over the downlink SACCH channel.

In another embodiment, a network node includes at least one memory including a set of instructions and at least one data processor coupled to the at least one memory and configured to execute the set of instructions. The at least one data processor is configured when the set of instructions are executed to perform operations including determining whether a block of data to be transmitted over the downlink SACCH channel from the network node to a mobile node is a repetition candidate. Operations also include, in response to the block of data being a repetition candidate, scheduling the block as a pair of blocks for transmission over the downlink SACCH channel from the network node to the mobile node. The scheduling includes in a first SACCH period, transmitting the block from the network node to the mobile node over the downlink SACCH channel, and in a second SACCH period, retransmitting the block from the network node to the mobile node over the downlink SACCH channel.

In yet another embodiment, a method is disclosed that is performed by a network node. The method includes receiving from a mobile node a first block of data over an uplink SACCH channel and storing the first block of data. The method additionally includes, subsequent to receiving the first block of data, receiving from the mobile node a second block of data over the uplink SACCH channel. The method further includes attempting to decode the second block of data and, in response to a failure in the attempt to decode the second block of data, combining into a combination the second block with the stored first block of data. The method further includes attempting to decode the combination.

In another illustrative embodiment, a program product is disclosed that tangibly embodies a program of machine-readable instructions executable by at least one data processor of a network node to perform operations. The operations include receiving from a mobile node a first block of data over an uplink SACCH channel and storing the first block of data. The operations additionally include, subsequent to receiving the first block of data, receiving from the mobile node a second block of data over the uplink SACCH channel. The operations also include attempting to decode the second block of data. The operations also include, in response to a failure in the attempt to decode the second block of data, combining into a combination the second block with the stored first block of data, and include attempting to decode the combination.

As yet another example, a network node is disclosed that includes at least one memory including a set of instructions and at least one data processor coupled to the at least one memory and configured to execute the set of instructions. The at least one data processor is configured when the set of instructions are executed to perform operations of receiving from a mobile node a first block of data over an uplink SACCH channel and storing the first block of data. The operations additionally include, subsequent to receiving the first block of data, receiving from the mobile node a second block of data over the uplink SACCH channel. The operations also include attempting to decode the second block of data. The operations also include, in response to a failure in the attempt to decode the second block of data, combining into a combination the second block with the first block of data, and include attempting to decode the combination.

In a further example, a method is disclosed for providing SACCH repetition on an uplink SACCH channel. The method includes determining whether a block of data to be transmitted over the uplink SACCH channel from a mobile node to a network node is a repetition candidate, and, in response to the block of data being a repetition candidate, scheduling the block as a pair of blocks for transmission over the uplink SACCH channel from the mobile node to the network node. The scheduling includes, in a first SACCH period, transmitting the block from the mobile node to the network node over the uplink SACCH channel. The scheduling also includes, in a second SACCH period, retransmitting the block from the mobile node to the network node over the uplink SACCH channel.

In an additional embodiment, a program product is disclosed that tangibly embodies a program of machine-readable instructions executable by at least one data processor of a mobile node to perform operations. The operations include determining whether a block of data to be transmitted over the uplink SACCH channel from the mobile node to a network node is a repetition candidate, and, in response to the block of data being a repetition candidate, scheduling the block as a pair of blocks for transmission over the uplink SACCH channel from the mobile node to the network node. The scheduling includes in a first SACCH period, transmitting the block from the mobile node to the network node over the uplink SACCH channel, and in a second SACCH period, retransmitting the block from the mobile node to the network node over the uplink SACCH channel.

In another exemplary embodiment, a mobile node is disclosed that includes at least one memory including a set of instructions. The mobile node also includes at least one data processor coupled to the at least one memory and configured to execute the set of instructions, the at least one data processor configured when the set of instructions are executed to perform operations. The operations include determining whether a block of data to be transmitted over the uplink SACCH channel from the mobile node to a network node is a repetition candidate, and in response to the block of data being a repetition candidate, scheduling the block as a pair of blocks for transmission over the uplink SACCH channel from the mobile node to the network node. The scheduling includes in a first SACCH period, transmitting the block from the mobile node to the network node over the uplink SACCH channel, and in a second SACCH period, retransmitting the block from the mobile node to the network node over the uplink SACCH channel.

BRIEF DESCRIPTION OF THE DRAWINGS

The examples of this invention are made more evident in the following Detailed Description, when read in conjunction with the attached Drawing Figures, wherein.

DETAILED DESCRIPTION OF EXEMPLARY EMBODIMENTS

To solve the drawbacks inherent in at least the Parallel SACCH and Spread SACCH proposals discussed above, the examples of this invention exploit a repetition that is already inherent on the SACCH.

Figure 1:
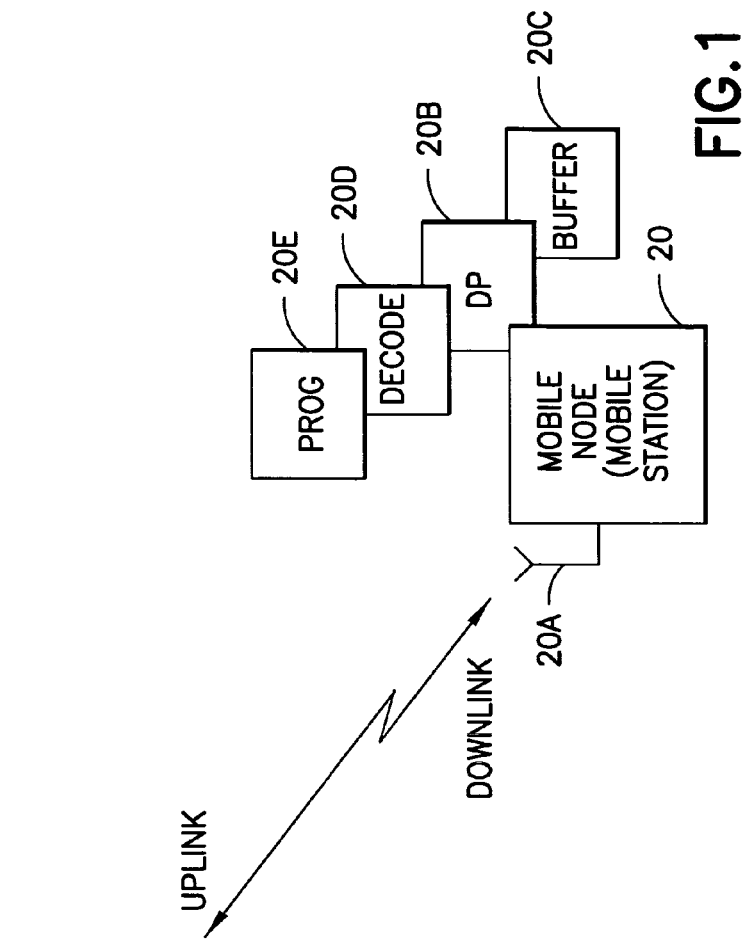
FIG. 1 is a block diagram shown a network node coupled to a mobile node, that is one suitable embodiment for practicing the teachings of this invention.
Figure 2:
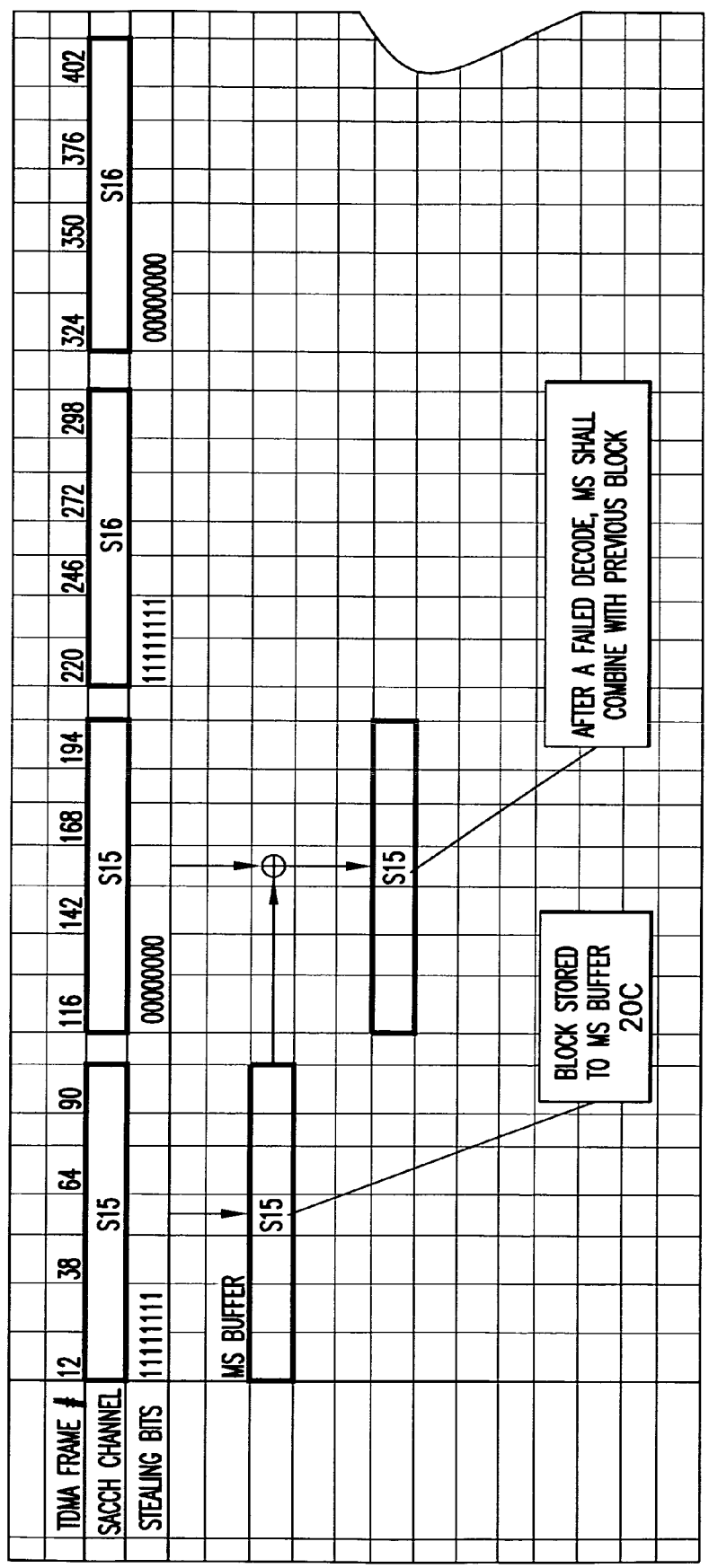
FIG. 2 shows the use of the examples of this invention on the downlink SACCH channel.

Referring first to FIG. 1, there is shown as a non-limiting example a network 10 that includes a BSS 10A having at least one antenna 10B for transmitting on the downlink (DL) to a mobile node, also referred to as a mobile station (MS) 20. The BSS 10A is a network node, and can also include or be a Base Station Transceiver Subsystem (BTS), a base station controller, or any other element able to communicate with a mobile station on downlink and uplink SACCH channels. The antenna 10A also receives on the uplink (UL) a transmission from the MS 20. The MS 20 is assumed to include at least one suitable antenna 20A, as well as at least one data processor (DP) 20B coupled to a memory that includes a buffer 20C, decoder 20D, and program (PROG) 20E. The buffer 20C can be used to store a SACCH block as shown in FIG. 2 for use in subsequent combining with a later received SACCH block. The MS 20 also includes a suitable decoder 20D for decoding the SACCH block. The MS 20 also includes a PROG 20E, which, e.g., reads data from the buffer 20C, passes the data to the decoder 20D, controls the operation of the decoder 20D, and notifies the BSS 10A regarding whether or not SACCH repetition is requested on the downlink. The configuration shown in FIG. 1 is merely exemplary. For instance, the PROG 20E can be included as part of the decoder 20D, if desired. As another example, the PROG 20E, decoder 20D, and buffer 20C can be combined into one program.

The BSS 10A is also shown including one or more DPs 10C and a memory including a buffer 10D, a decoder 10E, and a PROG 10F. The buffer 10D is used to store a SACCH block on the uplink. The decoder 10E is for decoding the SACCH block. The PROG 10F operates to read data from the buffer 10D, pass the data to the decoder 10E, control the operation of the decoder 10E, and notify the MS 20 regarding whether or not SACCH repetition is requested on the uplink.

In general, the various embodiments of the MS 20 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In "Digital cellular telecommunications system (Phase 2+); Mobile radio interface layer 3 specification; Radio Resource Control (RRC) protocol" (3GPP TS 44.018 version 6.11.0 Release 6 (ETSI TS 144 018 V6.11.0 (2005-01)), Section 3.4.1.1, it is stated:

"The SACCH has the particularity that continuous transmission must occur in both directions at least on the channel carrying the main signaling link. For that purpose . . . SYSTEM INFORMATION TYPE 5, 6 and optionally 5bis and 5ter messages are sent in the network to mobile station direction in UI frames when nothing else has to be sent.

The network may in addition send MEASUREMENT INFORMATION messages on the SACCH, which may order the MS to use the enhanced measurement report."

Based on the assumption that these messages, and the TA and PC commands, do not change frequently, the inventors have realized that inherent repetition occurs on the SACCH channel, thereby enabling the MS 20 to apply soft decision combining on successive SACCH blocks that carry these messages.

In order to facilitate repetition, an aspect of the teachings of this invention is that, under network 10 control, the network Layer 1 (L1) re-schedules the UI blocks in pairs and indicates to the MS 20 when to attempt combining. This may be accomplished, as a non-limiting example, by the use of stealing bits, as they are currently not used on the SACCH (e.g., set to 0).

As this technique does not enforce repetition, the response times for the TA and PC should remain unaffected. As a consequence, changes between UI block pairs may occur. To account for this, the MS 20 performs 'double decoding' in order to avoid combining blocks that contain differences.

The overall concept is shown in FIG. 2. Note that when the stealing bits are set to one, the MS 20 stores the block into the buffer 20C, and after a subsequent failed decode combines the received block with the buffered block, thereby enhancing the robustness of receiving the DL SACCH channel. It is noted that data is communicated over a SACCH channel using decodable unit, conveying a message (e.g., an L3 message), where the decodable unit is called a SACCH block. The SACCH block is transmitted in four bursts over a 104 Time Division Multiple Access (TDMA) frame period (480 milliseconds), which is denoted as one SACCH period.

An exemplary embodiment of the invention is based at least in part on the assumption that differences between pairs of UI blocks do not occur often. This assumption is valid at least for the following reasons:

SI and PHYSICAL INFORMATION messages contain identities and options specific to the serving and neighbor cells, and thus change very seldom in a given cell;

a change in TA by one symbol corresponds to 0.55 km (at the speed of light) which for a MS 20 traveling at 50 km/s takes 39.6 s (82.4 SACCH periods); and changes in PC are dependent on the PC algorithm employed.

Nevertheless, when coverage limited (e.g. when the MS 20 is indoors) or interference limited (high interference), the use of maximum power can be assumed. To increase the likelihood of repetition, the BSS 10A may also delay a change in the PC command by one SACCH period.

The use of the examples of this invention does not affect TA or PC response times, and has but a small impact on the scheduling of UI blocks when channel conditions deteriorate. Consequently, the use of the examples of this invention would not have an impact on the performance of already deployed, legacy MSs 20. Further, in a legacy network the stealing bits of the SACCH will already be set (by default) so as to indicate that repetition is not in use.

Figure 3:
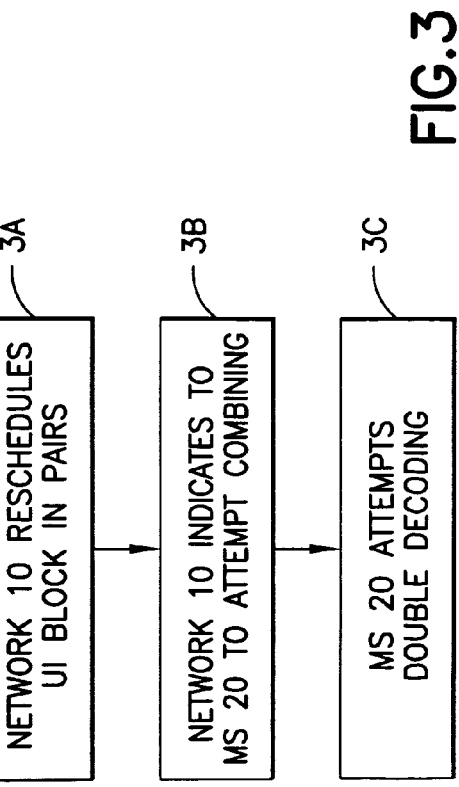
FIG. 3 is a logic flow diagram in accordance with the examples of this invention.

Implementation of the examples of this invention may be performed as follows (see also FIG. 3):

Block 3A, under network 10 control (e.g., based on measurement reports), the network 10 L1 re schedules UI blocks in pairs;

Block 3B, the network 10 L1 also indicates to the MS 20 when to attempt combining (e.g., by setting stealing bits to 1); and Block 3C, the MS 20, when indicated by the stealing bits, attempts double decoding.

The use of the examples of this invention solves the problems associated with existing proposals to enhance the SACCH. For example, neighbor cell monitoring by the MS 20 is not affected, speech quality is not affected, the procedure is compatible with the use of DTX, and the implementation complexity is significantly less.

As with the DL, messages must also be continuously transmitted in the UL. When nothing else is needed to be sent, these are measurement result messages and so would be expected to change from one message to the next. To overcome this, repetition may be forced in an exemplary embodiment (under network 10 control, e.g. whenever UI messages are being used on the DL).

The disclosed invention has been described through use of certain exemplary embodiments. Additional exemplary embodiments will now be described in reference to FIGS. 4-13. FIGS. 4-13 are implemented in 3GPP (3rd Generation Partnership Project) TS (Technical Standard) 44.006 version 6.2.0. FIGS. 4-8 are related to repetition of SACCH blocks over a downlink SACCH channel. FIGS. 9-13 are related to repetition of SACCH blocks over an uplink SACCH channel.

Figure 4:
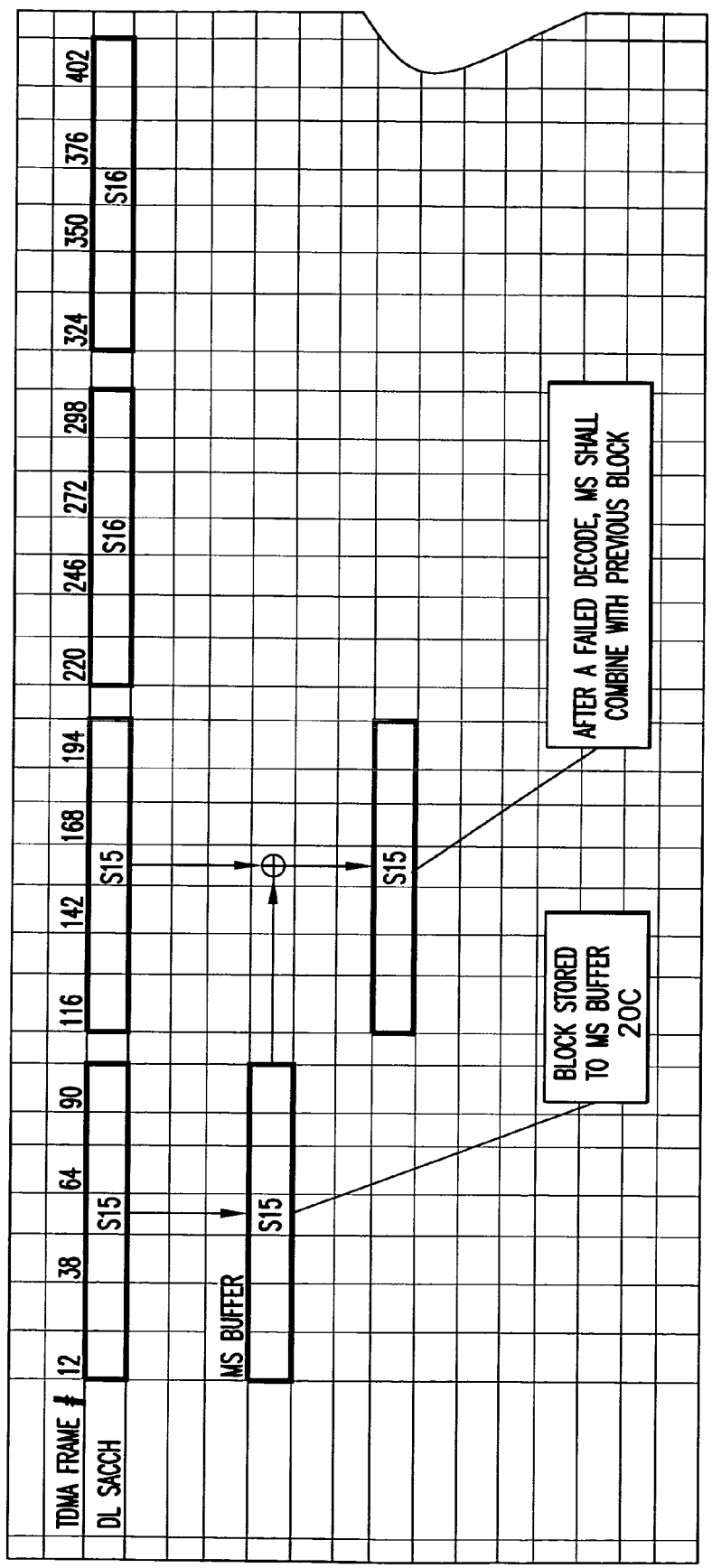
FIG. 4 is another example of the use of this invention on the downlink SACCH channel.

Referring now to FIG. 4, another example is shown of the use of this invention on the downlink SACCH channel. To increase the likelihood that the L3 message content and the SACCH L1 header content will not change between two consecutive SACCH blocks, and to facilitate combining by the MS 20, it is proposed that the network should reschedule L3 messages that are sent in UI blocks in pairs. This is pictured in FIG. 4, where the SACCH blocks S15 and S16 are each repeated (e.g., by the BSS 10A) on the downlink SACCH channel. In this example, the first SACCH block S15 (i.e., received over TDMA frames 12-116 in a first SACCH period) is received in a first SACCH period and is stored in the buffer 20C of the MS 20. The MS 20 attempts to decode the first SACCH block S15 and if decoding fails, the MS 20 will combine the repeated SACCH block S15 (i.e., received over TDMA frames 116-220 in a second SACCH period) with the first SACCH block.

Figure 5:
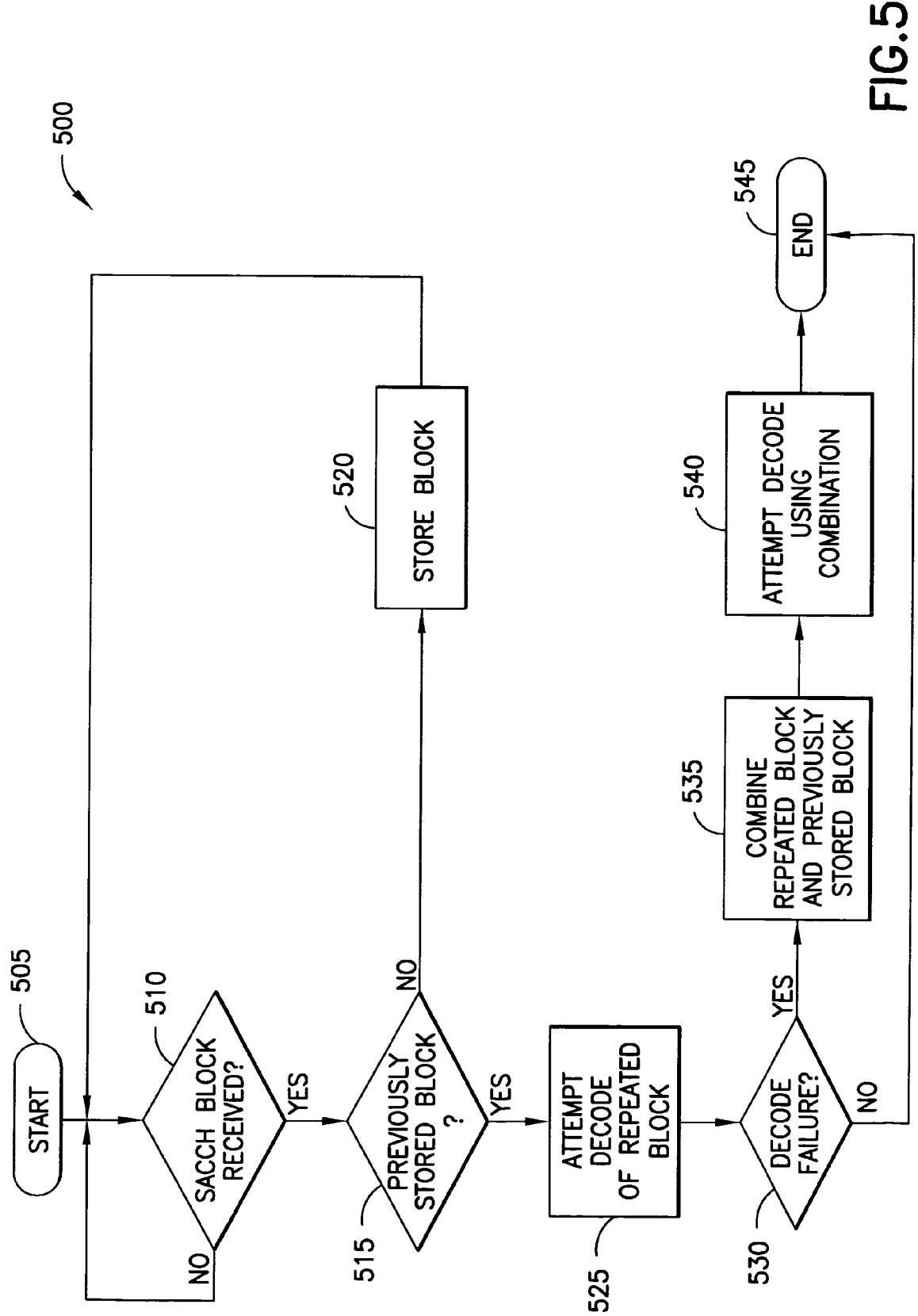
FIG. 5 is a flowchart of an exemplary method performed by a MS for decoding using repeated SACCH blocks on the downlink SACCH channel.

Referring now to FIG. 5, a flowchart is shown of an exemplary method 500 performed by a MS 20 (e.g., by PROG 20E of MS 20) for decoding using repeated SACCH blocks on the downlink SACCH channel. In this exemplary embodiment, method 500 starts in step 505. The method 500 waits for a SACCH block to be received on the downlink SACCH channel in step 510. If a SACCH block is not received (step 510=NO), the method continues to wait. In response to receiving a downlink SACCH block (step 510=YES), the MS 20 in this example will determine whether a SACCH block has been previously stored (step 515). If not (step 515=NO), the MS 20 stores the block into memory in step 520 and the method 500 returns to step 510 to await another SACCH block that is a repeated version of the SACCH block stored in step 520.

When the repeated SACCH block is received in a current SACCH period (e.g., a second pass through step 510), in step 515, there will be a previously stored SACCH block (step 515=YES) from a prior SACCH period, and an attempt is made by the MS 20 to decode the repeated SACCH block without combining with any previously received SACCH block (step 525). It should be noted that the "first" SACCH period in which the SACCH block stored in step 1020 is received is adjacent to the "second" SACCH period in which the repeated SACCH block is received, which means that another SACCH period does not occur between the first and second SACCH periods. If this decoding fails (step 530=YES), then the MS 20 combines the repeated block and previously stored block (step 535) and a new decoding is performed (step 540) using the combination, which includes information from the repeated SACCH block (e.g., received in the current SACCH period) and from the previously received SACCH block (e.g., received in the previous SACCH period). If the attempt at decoding in step 525 does not fail (step 530=NO), the method 500 ends in step 545, without an attempt at decoding using multiple SACCH blocks.

Figure 6:
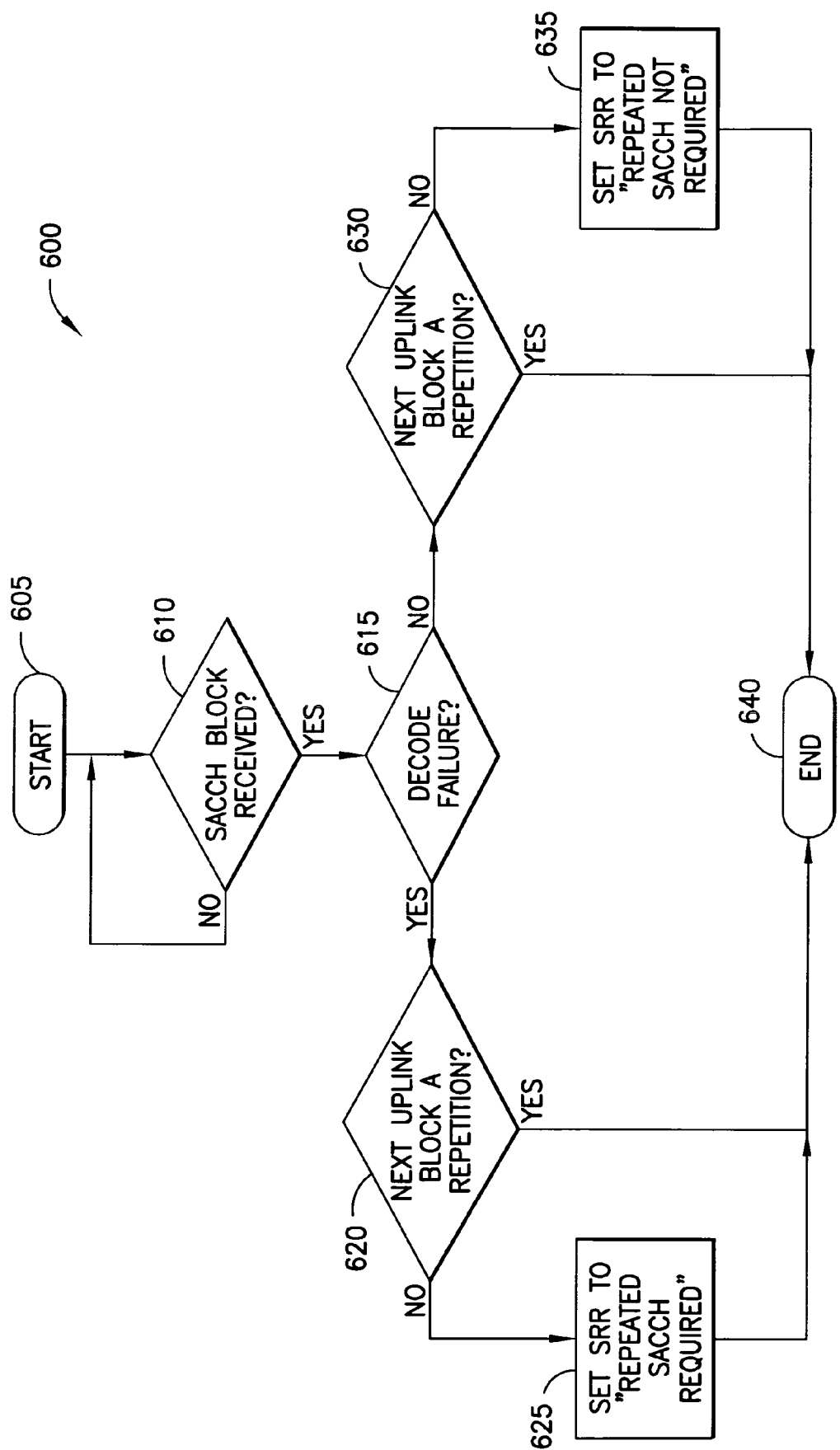
FIG. 6 is a flowchart of an exemplary method performed by a MS for notifying a BSS as to whether repeated SACCH blocks are requested on the downlink SACCH channel.

Turning to FIG. 6, a flowchart is shown of an exemplary method 600 performed by a MS 20 (e.g., by PROG 20E of MS 20) for notifying a BSS as to whether repeated SACCH blocks are requested on the downlink SACCH channel. Method 600 would typically be performed in parallel with method 500 of FIG. 5 and will use certain information of FIG. 5 (e.g., step 610 of FIG. 6 and step 510 of FIG. 5), but could also be incorporated with FIG. 5. Method 600 starts in step 605, and the method 600 waits for a SACCH block to be received on the downlink. If no SACCH block is received (step 610=NO), the method 600 continues to wait in step 610. Once a SACCH block is received, it is determined in step 615 if there has been a decode failure of the SACCH block.

Figure 8:
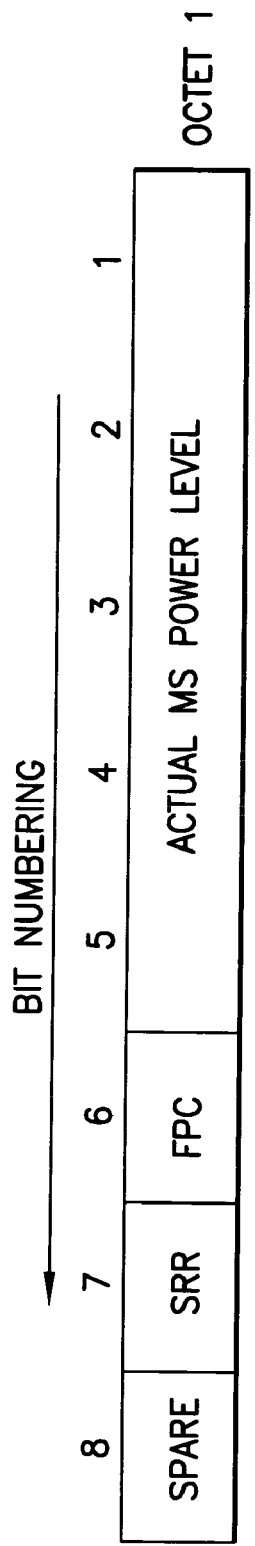
FIG. 8 is a block diagram of a portion of an uplink SACCH block format used by the MS to inform the BSS as to whether repeated SACCH blocks are requested on the downlink SACCH channel.

If a downlink SACCH block is incorrectly decoded prior to combining with any previously received SACCH block (step 615=YES), it is determined (step 620) if the next uplink SACCH block is not a repetition SACCH block. If the next uplink SACCH block is not a repetition SACCH block, then the MS 20 sets the SACCH Repetition Request (SRR) in the next uplink SACCH block to "Repeated SACCH required" (step 625). The SACCH Repetition Request is part of a SACCH block, as shown in FIG. 8. If the next uplink SACCH block is a repetition SACCH block (step 620=YES), the method 600 ends in step 640.

If a downlink SACCH block is correctly decoded prior to combining with any previously received SACCH block (step 615=NO), it is determined in step 630 if the next uplink SACCH block is not a repetition SACCH block. If the next uplink SACCH block is not a repetition SACCH block (step 630=NO), the MS 20 sets the SACCH Repetition Request (SRRR) in the next uplink SACCH block to "Repeated SACCH not required" (step 635). If the next uplink SACCH block is a repetition SACCH block (step 630=YES), the method 600 ends in step 640.

Figure 7:
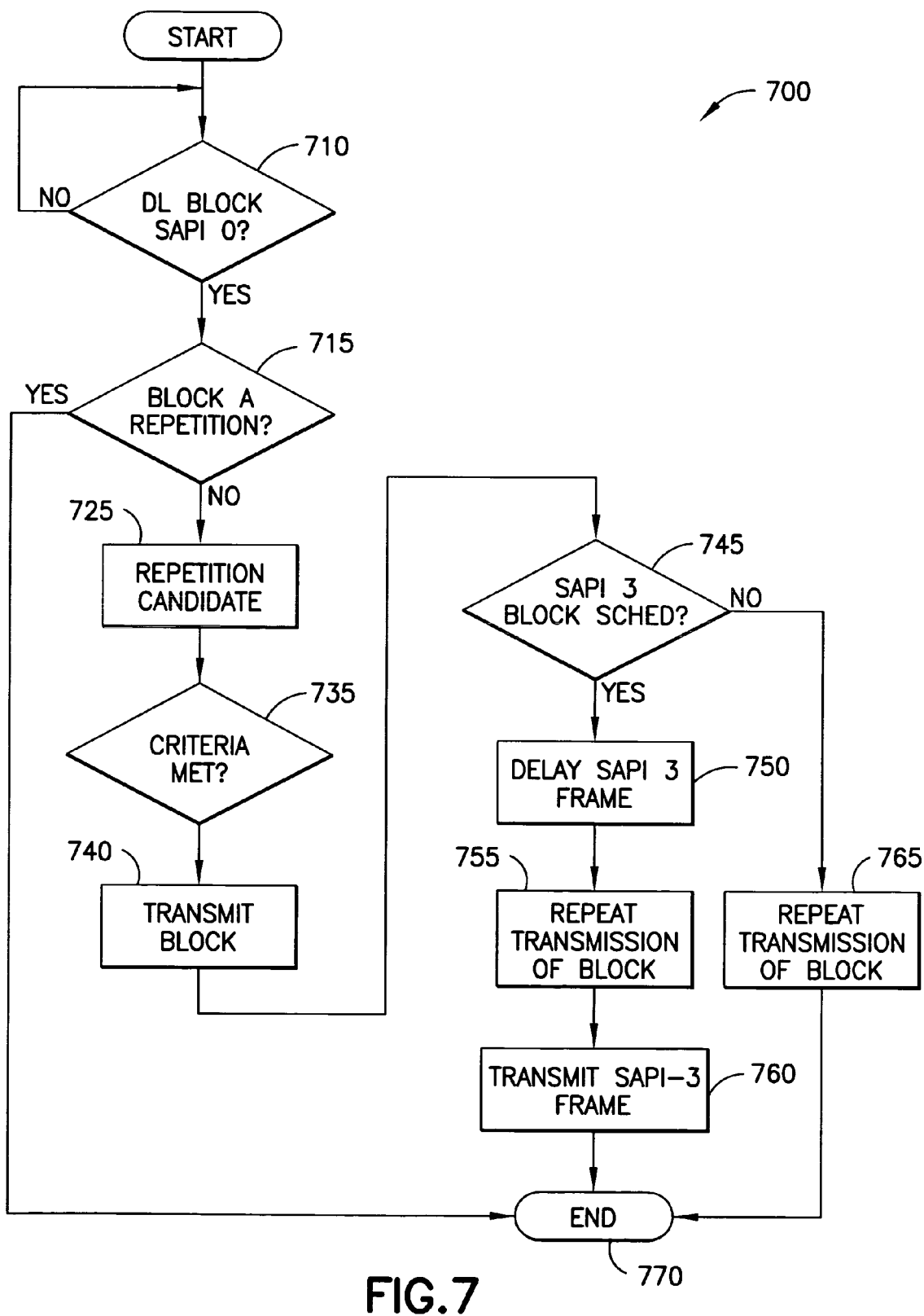
FIG. 7 is a flowchart of an exemplary method performed by a BSS for scheduling a SACCH block in pairs on the downlink SACCH channel.

Referring now to FIG. 7, a flowchart is shown of an exemplary method 700 performed by a BSS 10A (e.g., by PROG 10F of BSS 10A) for scheduling a SACCH block in pairs on the downlink SACCH channel. Method 700 starts in step 705. In step 710, it is determined if a downlink (DL) SACCH block is a Service Access Point Identifier (SAPI) 0 (zero) frame. If not (step 710=NO), the method 700 waits in step 710.

At the BSS side, if a downlink SACCH block (e.g., to be transmitted) contains a SAPI 0 frame (step 710=YES) and the SACCH block is not already a repetition SACCH block (step 715=NO), then the SACCH block is a repetition candidate (step 725). On the other hand, if the SACCH block is a repetition SACCH block (step 715=YES), the method 700 ends in step 770. If the value of the last correctly received SACCH Repetition Request (SRR) from the MS 20 is, e.g., "Repeated SACCH not required" (step 730=NO) and other implementation-dependent criteria are not met (step 735=NO), the method 700 ends in step 770.

If a SACCH block is a repetition candidate (step 725) then the BSS 10A may, based on implementation-dependent criteria (step 735=YES) (e.g., a single criterion), repeat this SACCH block at the next SACCH period. One such criterion is the value (e.g., "Repeated SACCH required") of the last correctly received SACCH Repetition Request (SRR) from the MS 20 (step 730=YES). Note that the SRR is communicated in an exemplary embodiment to the BSS 10A by the MS 20 by using an uplink SACCH channel. Other criteria include but are not limited to the BSS 10A ignoring the SRR and deciding to continuously provide repetitions. Yet other criteria include the BSS 10A deciding to suspend repetitions if a SAPI 3 (three) frame (i.e., Short Message Service, SMS, messages) is awaiting transmission. In the current SACCH period, the SACCH block is transmitted in step 740.

When the SACCH block is to be repeated, if a SAPI 3 (three) frame was also scheduled to be sent at the next SACCH period (step 745=YES), the BSS 10A may delay (step 750) the sending of the SAPI 3 frame by one SACCH period in order to make room for the repetition SACCH block. The SACCH block (e.g., from step 740) is retransmitted in the next SACCH period in step 755, then the SAPI 3 (three) block is transmitted in a SACCH period subsequent to the next SACCH period in step 760. For instance if step 740 occurs at a first SACCH period, step 755 typically occurs at a second SACCH period, and the SAPI 3 frame would be transmitted in a third or later SACCH period. When the SACCH block is to be repeated, if a SAPI 3 (three) frame was not scheduled to be sent at the next SACCH period (step 745=NO), the SACCH block is retransmitted in the next SACCH period (step 765). The method 700 ends in step 770.

In FIG. 8, a block diagram is shown of a portion of an uplink SACCH block format used by the MS to inform the BSS as to whether repeated SACCH blocks are requested on the downlink SACCH channel. Only the first octet of 23 octets of an uplink SACCH block format is shown. The SRR shown in FIG. 8 is a SACCH Repetition Request and is implemented in this example as a single bit. In an exemplary embodiment, a value for the SRR of zero (0) is interpreted as "Repeated SACCH not required" and a value of one (1) is interpreted as "Repeated SACCH required". See 3GPP (3rd Generation Partnership Project) TS (Technical Standard) 44.004, version 6.1.0, release 6 for other parts of the uplink SACCH block. Prior to version 6.1.0 of the TS 44.004, there were two spare bits in bit positions 7 and 8 of the first octet (octet 1). With version 6.1.0, a spare bit of the UL SACCH L1 header is now known as the SACCH Repetition Request (SRR).

Turning now to use of exemplary embodiments of the invention on the uplink SACCH channel, as with the downlink SACCH, messages are also typically continuously transmitted on the uplink SACCH. When nothing else needs to be sent, these messages are measurement result messages and so would expect to change from one message to the next. The opportunity to perform combining in the uplink will therefore not be as flexible as it is in the downlink.

To improve this situation, forced repetition of SACCH blocks could be employed, where the decoding performance of the uplink SACCH would be improved at the cost of reducing the update rate of the measurement reports. For example, repetition of every SACCH block would give a link gain but at a cost of reducing the granularity of the handover decisions from once every SACCH period to once every two SACCH periods (e.g., assuming that measurement report averaging is not employed in the BSS 10A). However, when channel conditions deteriorate on the uplink and the uplink SACCH FER (Frame Exposure Rate) worsens, then this too will thus reduce the granularity of the handover decisions.

If the BSS 10A were able to predict the occurrence of failures on the uplink SACCH and be able to determine when repetition of SACCH blocks will occur on the uplink SACCH, then the BSS 10A should be able to limit repetition of SACCH blocks to only when a failure would occur. This would lead to an improvement in the decoding performance of the uplink SACCH without a reduction of granularity of the handover.

Figure 13:
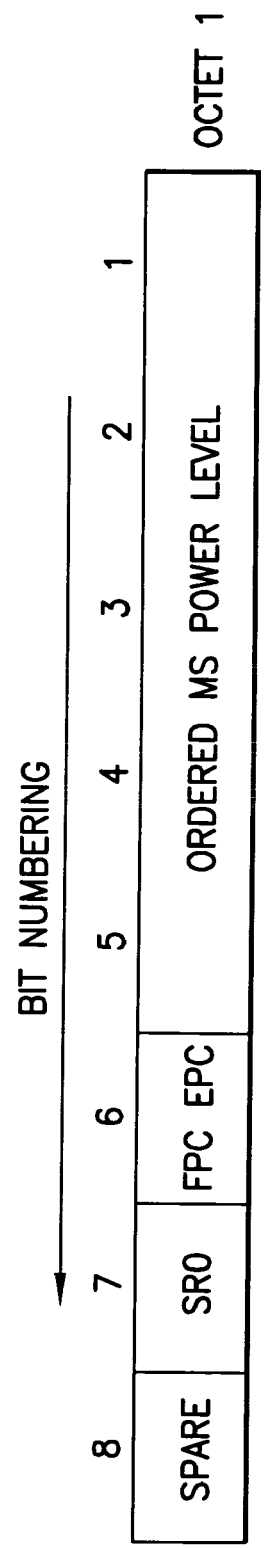
FIG. 13 is a block diagram of a portion of a downlink SACCH block format used by the BSS to inform the MS as to whether repeated SACCH blocks are requested on the uplink SACCH channel.

In practice, the reliability of this approach would be dependent on the ability of the BSS 10A to predict a failure on the uplink SACCH channel. Whilst this could be left to implementation, indicators such as the uplink SACCH BFI (Bad Frame Indication) or the uplink RLT (Radio Link Timeout) counter could be used. The stealing bits of the SACCH have been proposed for use with an existing feature called Enhanced Power Control (EPC), and in this instance, other techniques can be used for signaling the MS 20 when to perform repetition of SACCH blocks. In an exemplary embodiment herein, to signal to the MS 20 when to repeat UI blocks, one or more of the spare bits of the DL SACCH L1 header could be used, as shown in FIG. 13. In the example of FIG. 13, a spare bit of the DL SACCH L1 header is now known as an SACCH Repetition Order (SRO).

Figure 9:
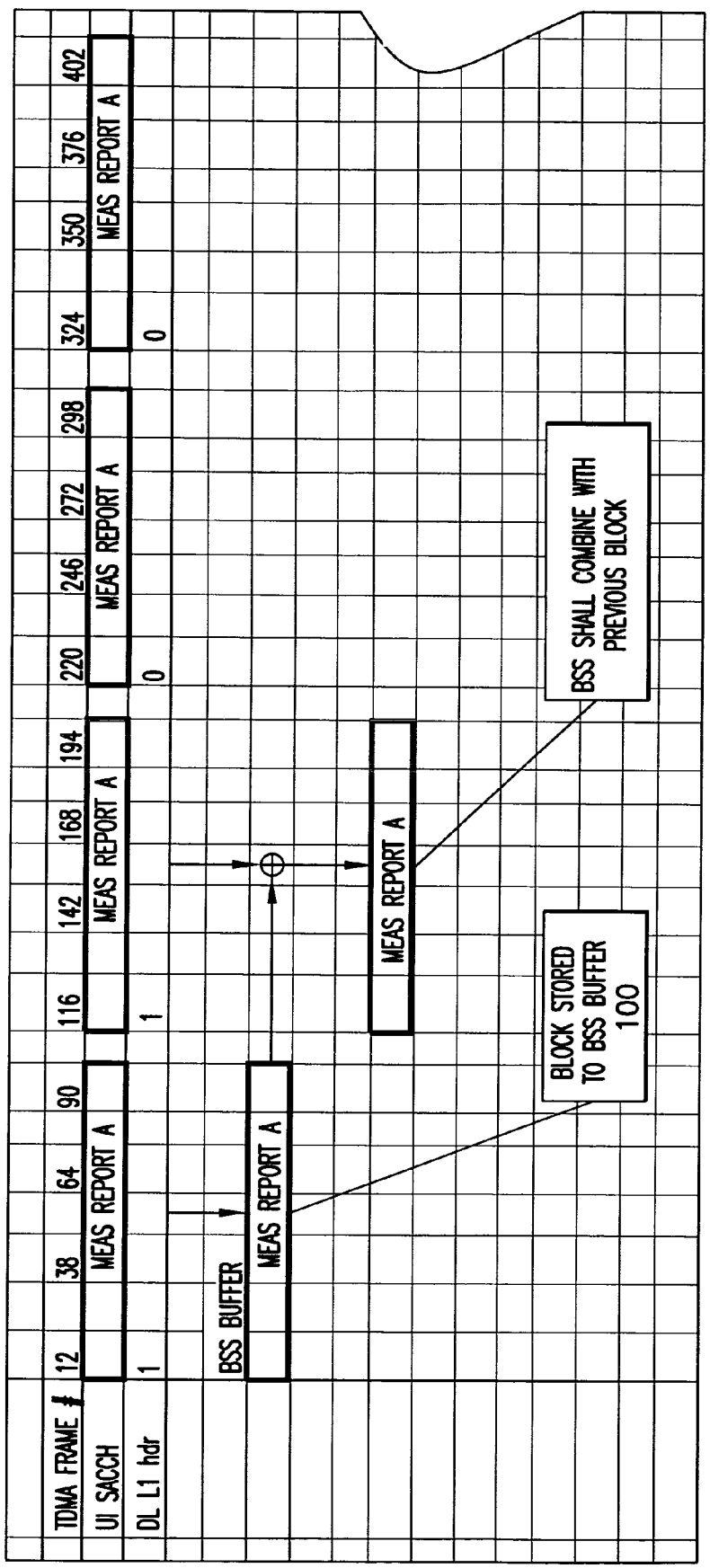
FIG. 9 is another example of the use of this invention on the uplink SACCH channel.

With regard to SACCH repetition on the uplink SACCH channel, in FIG. 9, another example is shown of the use of this invention on the uplink SACCH channel. The measurement report A (i.e., received over TDMA frames 12-116) is shown being repeated. The BSS 10A stores the measurement report A in the buffer 10D and attempts to decode the measurement report A. If the decoding of the measurement report fails, the BSS 10A then will receive the repeated SACCH block (i.e., received over TDMA blocks 116-220) of measurement report A and will combine the repeated SACCH block and the first SACCH block.

Figure 10:
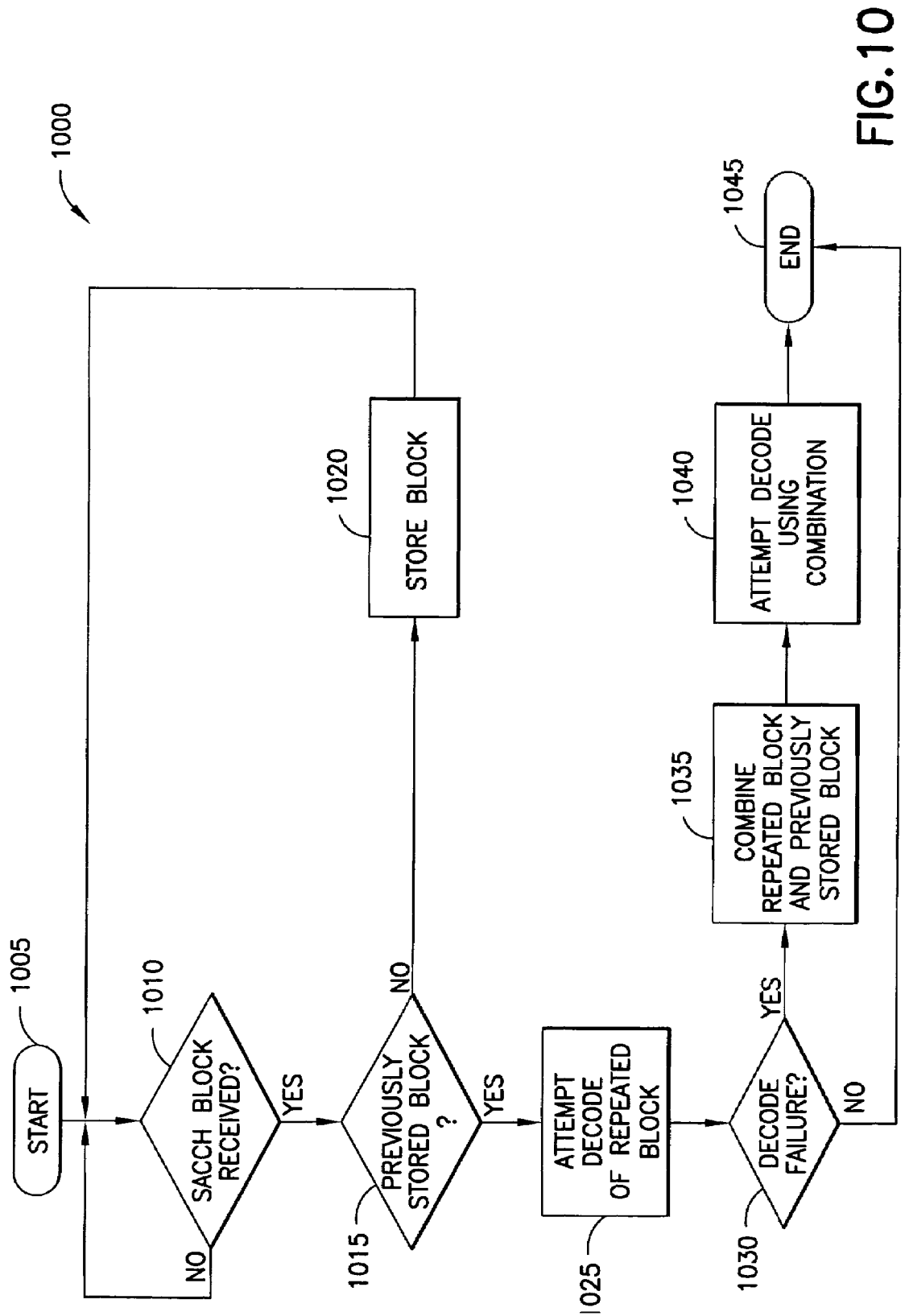
FIG. 10 is a flowchart of an exemplary method performed by a BSS for decoding using repeated SACCH blocks on the uplink SACCH channel.

Turning to FIG. 10, a flowchart is shown of an exemplary method 1000 performed by a BSS 10A (e.g., by PROG 10F of BSS 10A) for decoding using repeated SACCH blocks on the uplink SACCH channel. In this exemplary embodiment, method 1000 starts in step 1005. The method 1000 waits for a SACCH block to be received on the uplink SACCH channel in step 1010. If a SACCH block is not received (step 1010=NO), the method 1000 continues to wait. In response to receiving an uplink SACCH block (step 1010=YES), the BSS 10A in this example determines in step 1015 whether a SACCH block has been previously stored (step 1015). If not (step 1015=NO), the method 1000 stores the SACCH block in step 1020 and returns to step 1010 to await a repeated SACCH block that is a repeated version of the SACCH block stored in step 1020.

When the repeated SACCH block is received in a current SACCH period (e.g., a second pass through step 1010), in step 1015, there will be a previously stored SACCH block (step 1015=YES) from a prior SACCH period, and an attempt is made by the BSS 10A to decode the repeated SACCH block without combining with any previously received SACCH block (step 1025). If this decoding fails (step 1030=YES), then the BSS 10A combines the repeated block and previously stored block (step 1035) and a new decoding is performed (step 1040) using the combination, which includes information from the repeated SACCH block (e.g., received in a current SACCH period) and from the SACCH block received in the previous SACCH period. If the decoding in step 1030 does not fail (step 1030=NO), the method 1000 ends in step 1045, without an attempt at decoding using multiple SACCH blocks.

In the example of FIG. 5, the MS 20 will typically not be required to notify (see FIG. 6) the BSS 10A of failure of decoding of a SACCH block received on the downlink. This is true because the SACCH blocks on the downlink SACCH channel typically do not change that often between SACCH periods. On the other hand, because SACCH blocks on the uplink SACCH channel are more probably going to change between SACCH periods, the BSS 10A will typically notify the MS 20 when a decoding fails of a SACCH block received from the uplink SACCH channel.

Figure 11:
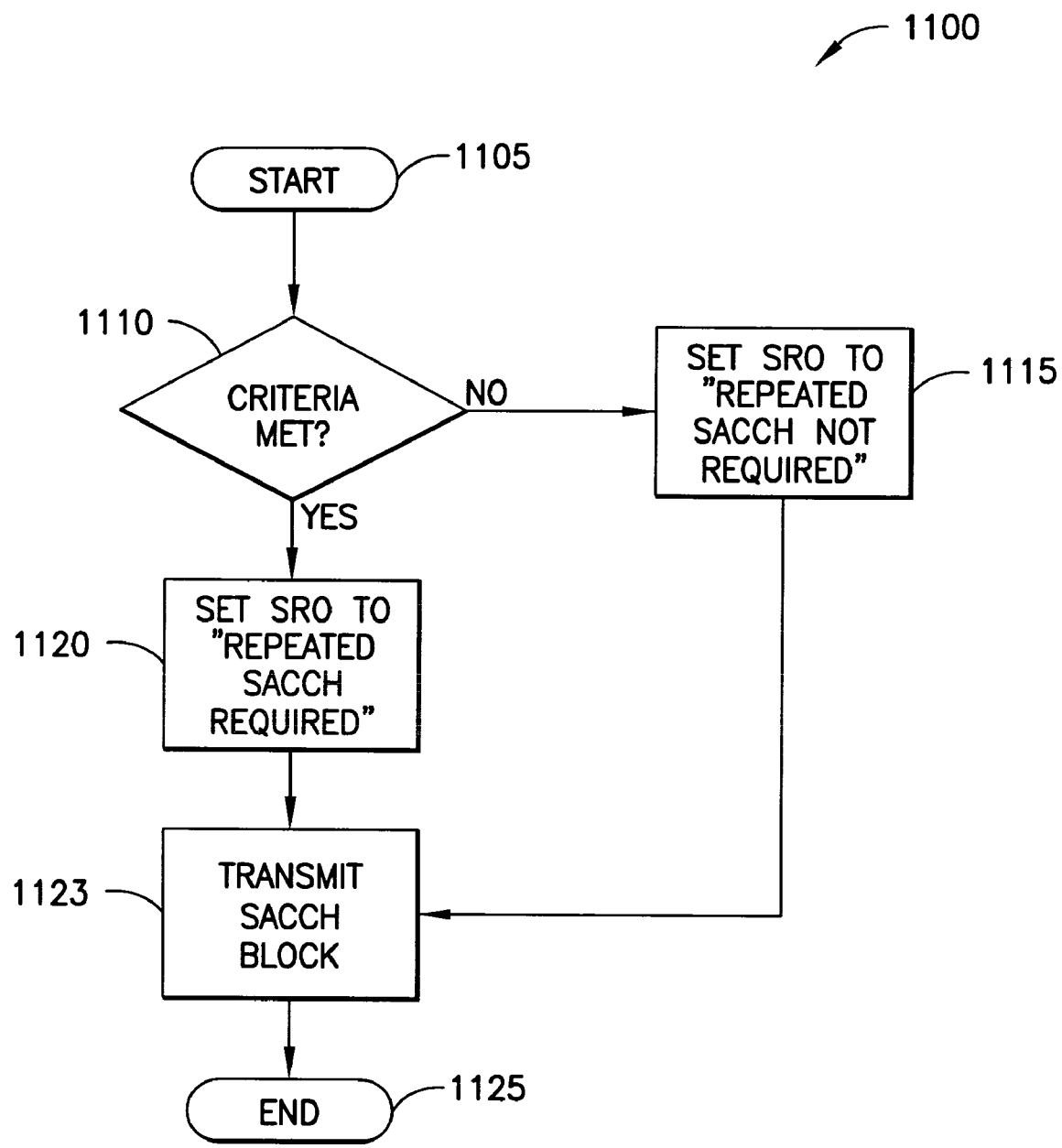
FIG. 11 is a flowchart of an exemplary method performed by a BSS for notifying a MS as to whether repeated SACCH blocks are requested on the uplink SACCH channel.

Referring now to FIG. 11, a flowchart is shown of an exemplary method 1100 performed by a BSS 10A (e.g., by PROG 10F of BSS 10A) for notifying a MS 20 as to whether repeated SACCH blocks are requested on the uplink SACCH channel. Method 1100 starts in step 1105. In step 1110, the method 1100 determines whether criteria are met for requesting repetition to be performed by the MS 20 on the uplink SACCH channel. The request for repetition to be performed includes, e.g., setting a value of the SACCH Repetition Order (SRO) of any downlink SACCH block. The value will determine whether repetition of SACCH blocks is performed by the MS 20 on the uplink. Such criteria are implementation-dependent and include, e.g., indicators such as the uplink SACCH BFI (Bad Frame Indication) or the uplink RLT (Radio Link Timeout) counter. Any criteria may be used for determining when to repeat SACCH blocks. It should be noted that a single criterion might be used in step 1110.

If the criteria are met (step 1110=YES), the BSS 10A sets the SACCH Repetition Order (SRO) in a SACCH block to be transferred on the downlink SACCH channel to the MS 20 to "Repeated SACCH required" (step 1120). A portion of a downlink block format is shown in FIG. 13. In the criteria are not met (step 1110=NO), the BSS 10A sets the SACCH Repetition Order (SRO) in a SACCH block being to be transferred on the downlink to the MS 20 to "Repeated SACCH not required" (step 1115). The BSS 10A 10A transmits the downlink SACCH block to the MS 20 in step 1123. The method ends in step 1125. It should be noted that if the next SACCH block to be transferred on the downlink is a repetition block, the BSS 10A could delay setting the SACCH Repetition Order (SRO) until the next available SACCH block that is not a repetition block.

Figure 12:
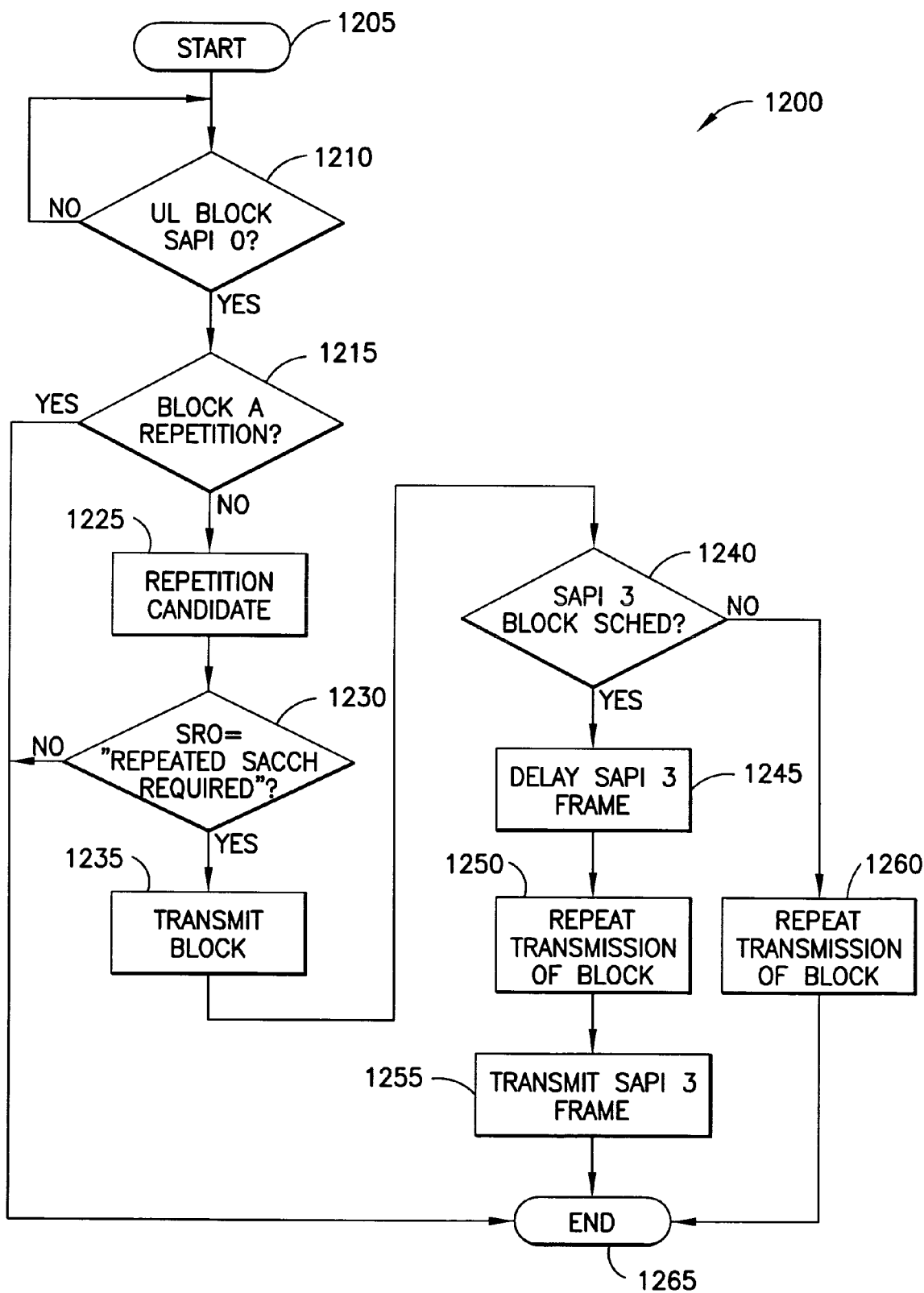
FIG. 12 is a flowchart of an exemplary method performed by a MS for scheduling a SACCH block in pairs on the uplink SACCH channel.

Turning to FIG. 12, a flowchart is shown of an exemplary method 1200 performed by a MS 20 (e.g., by PROG 20E of the MS 20) for scheduling a SACCH block in pairs on the uplink SACCH channel. At the MS side, method 1200 begins in step 1205 and the method 1200 waits in step 1210 for an uplink SACCH block that is a SAPI 0 (zero) frame. If an uplink SACCH block contains a SAPI 0 frame (step 1210=YES) and is not already a repetition block (step 1215=NO), then the SACCH block is a repetition candidate (step 1225). If the SACCH block is a repetition block (step 1215=YES), the method 1200 ends in step 1265. If a SACCH block is a repetition candidate (step 1225) and if the last correctly received SACCH Repetition Order was set to "Repeated SACCH required" (step 1230=YES), then the MS 20 schedules this SACCH block for repetition. In the current SACCH period, the SACCH block is transmitted (step 1235).

If a SAPI 3 (three) frame was also scheduled to be sent at the next SACCH period (step 1240=YES), the MS 20 delays (step 1245) the sending of the SAPI 3 (three) frame by, e.g., one SACCH period in order to make room for the repetition of the SAPI 0 (zero) frame. The SACCH block is repeated by retransmitting the block (transmitted already in step 1235) in the next SACCH period (step 1250). The MS 20 then transmits the delayed SAPI 3 frame in a subsequent period (step 1255). If a SAPI 3 (three) frame was not scheduled to be sent at the next SACCH period (step 1240=NO), the SACCH block transmitted in step 1235 is retransmitted in step 1260 in the next SACCH period. Method 1200 ends in step 1265.

FIG. 13 is a block diagram of a portion of a downlink SACCH block format used by the BSS 10A (e.g., PROG 10F of the BSS 10A 10A) to inform the MS 20 as to whether repeated SACCH blocks are requested on the uplink SACCH channel. The SACCH block format includes 23 octets, and the first octet is shown in FIG. 13. See 3GPP (3rd Generation Partnership Project) TS (Technical Standard) 44.004, version 6.1.0, release 6 for other parts of the downlink SACCH block. Prior to version 6.1.0 of the TS 44.004, there were two spare bits in bit positions 7 and 8 of the first octet (octet 1). With version 6.1.0, a spare bit of the DL SACCH L1 header is now known as a SACCH Repetition Order (SRO). In the example of FIG. 13, the SACCH Repetition Order (SRO) is bit 7 (seven) of octet 1 (one). In an exemplary embodiment, a value for the SRO of zero (0) is interpreted as "Repeated SACCH not required" and a value of one (1) is interpreted as "Repeated SACCH required".

The examples of this invention thus pertain at least in part to methods, computer program products, and apparatus at the network 10 side to reschedule UI blocks in pairs; and to indicate to the MS 20 when to attempt combining (e.g., by setting stealing bits to 1). The examples of this invention thus also pertain at least in part to methods, computer program products, and apparatus at the MS 20 side to be responsive to the state of at least one stealing bit or other bits to attempt double decoding of received SACCH blocks.

In general, the various embodiments herein may be implemented in hardware (e.g., special purpose circuits and logic), software (e.g., firmware), or any combination thereof. For example, some aspects may be implemented in hardware, while other aspects may be implemented in software which may be executed by a controller, microprocessor or other computing device, although the invention is not limited thereto. While various aspects of the invention may be illustrated and described as block diagrams, flowcharts, or using some other pictorial representation, it is well understood that these blocks, apparatus, systems, techniques or methods described herein may be implemented in, as non-limiting examples, hardware, software or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Exemplary embodiments may also be implemented as a signal bearing medium tangibly embodying a program of machine-readable instructions executable by at least one data processor to perform operations described herein. The signal bearing medium includes, as non-limiting examples, Compact Disk Read Only Memories (CDROMs), Digital Versatile Disks (DVDs), hard drives, and downloadable program code.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent DL signaling techniques for informing the MS 20 of when to attempt combining (e.g., other than the use of stealing bit(s)) may be attempted by those skilled in the art. However, all such and similar modifications of the teachings of this invention will still fall within the scope of the embodiments of this invention.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method comprising:
   receiving from a network node a first block of data over a downlink Slow Associated Control Channel (SACCH) channel by a mobile node;
   storing the first block of data;
   subsequent to receiving the first block of data, receiving from the network node a second block of data over the downlink SACCH channel;
   attempting to decode the second block of data;
   in response to a failure in the attempt to decode the second block of data, combining into a combination the second block of data with the stored first block of data; and
   attempting to decode the combination.

2. The method of claim 1, wherein each of the first and second blocks of data comprise the same data when transmitted.

3. The method of claim 1, wherein the first block is received during a first SACCH period, the second block is received during a second SACCH period, the first SACCH period occurs prior to the second SACCH period, and the first and second SACCH periods are adjacent SACCH periods.

4. The method of claim 1, wherein each of the first and second blocks received from the network node on the downlink SACCH channel comprises an Un-numbered Information (UI) block.

5. The method of claim 1, further comprising in response to the failure in the attempt to decode the second block, setting a SACCH Repetition Request in an uplink SACCH block to "Repeated SACCH required", and transmitting the uplink SACCH block from the mobile node to the network node.

6. The method of claim 5, further comprising determining if a block of data to be transmitted on an uplink SACCH channel in a next SACCH period is a repetition, and performing setting the SACCH Repetition request in response to the block of data to be transmitted on the uplink SACCH channel in a next period not being a repetition.

7. A program product tangibly embodying a program of machine-readable instructions executable by at least one data processor of a mobile node to perform operations comprising:
   receiving from a network node a first block of data over a downlink Slow Associated Control Channel (SACCH) channel;
   storing the first block of data;
   subsequent to receiving the first block of data, receiving from the network node a second block of data over the downlink SACCH channel;
   attempting to decode the second block of data;
   in response to a failure in the attempt to decode the second block of data, combining into a combination the second block with the stored first block of data; and
   attempting to decode the combination.

8. The program product of claim 7, wherein each of the first and second blocks of data comprise the same data when transmitted.

9. The program product of claim 7, wherein the first block is received during a first SACCH period, the second block is received during a second SACCH period, the first SACCH period occurs prior to the second SACCH period, and the first and second SACCH periods are adjacent SACCH periods.

10. The program product of claim 7, wherein each of the first and second blocks received from the network node on the downlink SACCH channel comprises an Un-numbered Information (UI) block.

11. The program product of claim 7, further comprising in response to the failure in the attempt to decode the second block, the operations of setting a SACCH Repetition Request in an uplink SACCH block to "Repeated SACCH required", and transmitting the uplink SACCH block from the mobile node to the network node.

12. The program product of claim 11, further comprising the operations of determining if a block of data to be transmitted on an uplink SACCH channel in a next SACCH period is a repetition, and performing setting the SACCH Repetition request in response to the block of data to be transmitted on the uplink SACCH channel in a next period not being a repetition.

13. A mobile node comprising:
   at least one memory comprising a set of instructions; and
   at least one data processor coupled to the at least one memory and configured to execute the set of instructions, the at least one data processor configured when the set of instructions are executed to perform the operations of:
   receiving from a network node a first block of data over a downlink Slow Associated Control Channel (SACCH) channel;

storing the first block of data;
subsequent to receiving the first block of data, receiving from the network node a second block of data over the downlink SACCH channel;
attempting to decode the second block of data;
in response to a failure in the attempt to decode the second block of data, combining into a combination the second block with the stored first block of data; and
attempting to decode the combination.

14. The mobile node of claim 13, wherein, in response to the failure in the attempt to decode the second block, the operations further comprise setting a SACCH Repetition Request in an uplink SACCH block to "Repeated SACCH required", and transmitting the uplink SACCH block from the mobile node to the network node.

15. The mobile node of claim 14, wherein the operations further comprise determining if a block of data to be transmitted on an uplink SACCH channel in a next SACCH period is a repetition, and performing setting the SACCH Repetition request in response to the block of data to be transmitted on the uplink SACCH channel in a next period not being a repetition.

16. A method comprising:
receiving from a mobile node a first block of data over an uplink Slow Associated Control Channel (SACCH) channel by a network node;
storing the first block of data;
subsequent to receiving the first block of data, receiving from the mobile node a second block of data over the uplink SACCH channel;
attempting to decode the second block of data;
in response to a failure in the attempt to decode the second block of data, combining into a combination the second block with the stored first block of data; and
attempting to decode the combination.

17. The method of claim 16, wherein the first block is received during a first SACCH period, the second block is received during a second SACCH period the first SACCH period occurs prior to the second SACCH period, and the first and second SACCH periods are adjacent SACCH periods.

18. The method of claim 16, further comprising determining if at least one criterion is met for requesting repetition to be performed by the mobile node on the uplink SACCH channel.

19. The method of claim 18, further comprising in response to the at least one criterion being met, transmitting to the mobile node a downlink SACCH block that includes a SACCH Repetition Order having a value of "Repeated SACCH required".

20. A program product tangibly embodying a program of machine-readable instructions executable by at least one data processor of a network node to perform operations comprising:
receiving from a mobile node a first block of data over an uplink Slow Associated Control Channel (SACCH) channel;
storing the first block of data;
subsequent to receiving the first block of data, receiving from the mobile node a second block of data over the uplink SACCH channel;
attempting to decode the second block of data;
in response to a failure in the attempt to decode the second block of data, combining into a combination the second block with the stored first block of data; and
attempting to decode the combination.

21. The program product of claim 20, wherein the first block is received during a first SACCH period, the second block is received during a second SACCH period, the first SACCH period occurs prior to the second SACCH period, and the first and second SACCH periods are adjacent SACCH periods.

22. The program product of claim 20, further comprising the operation of determining if at least one criterion is met for requesting repetition to be performed by the mobile node on the uplink SACCH channel.

23. The program product of claim 22, further comprising in response to the at least one criterion being met, the operation of transmitting to the mobile node a downlink SACCH block that includes a SACCH Repetition Order having a value of "Repeated SACCH required".

24. A network node comprising:
at least one memory comprising a set of instructions; and
at least one data processor coupled to the at least one memory and configured to execute the set of instructions, the at least one data processor configured when the set of instructions are executed to perform the operations of:
receiving from a mobile node a first block of data over an uplink Slow Associated Control Channel (SACCH) channel;
storing the first block of data;
subsequent to receiving the first block of data, receiving from the mobile node a second block of data over the uplink SACCH channel;
attempting to decode the second block of data;
in response to a failure in the attempt to decode the second block of data, combining into a combination the second block with the stored first block of data; and
attempting to decode the combination.

25. The network node of claim 24, further comprising the operation of determining if at least one criterion is met for requesting repetition to be performed by the mobile node on the uplink SACCH channel.

26. The network node of claim 25, further comprising in response to the at least one criterion being met, the operation of transmitting to the mobile node a downlink SACCH block that includes a SACCH Repetition Order having a value of "Repeated SACCH required".

* * * * *